O. A. KENYON.
METHOD OF SERIES ARC WELDING.
APPLICATION FILED JAN. 9, 1918.

1,303,481.

Patented May 13, 1919.
2 SHEETS—SHEET 1.

Inventor.
Otis A. Kenyon.
By T. Walter Fowler
Attorney.

O. A. KENYON.
METHOD OF SERIES ARC WELDING.
APPLICATION FILED JAN. 9, 1918.
Patented May 13, 1919.
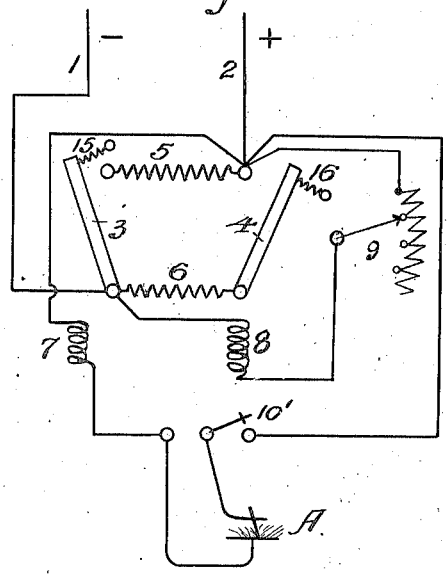
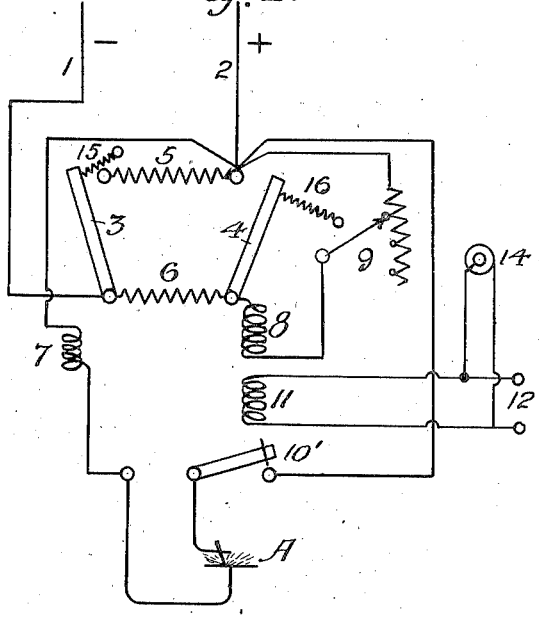
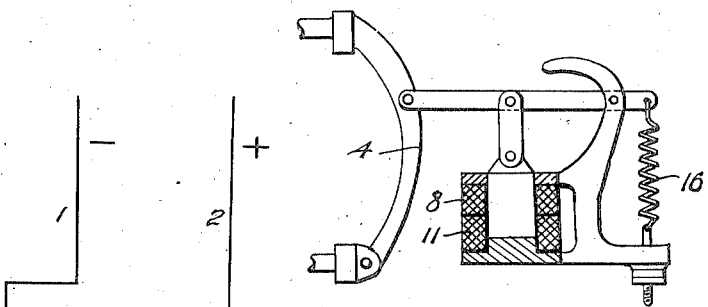
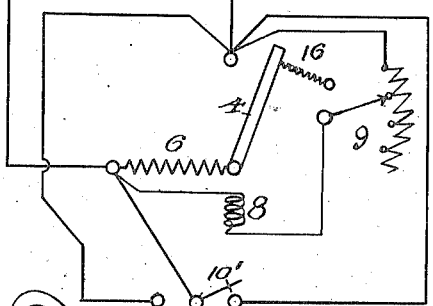
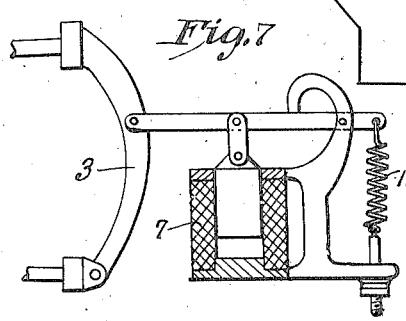
Inventor.
Otis A. Kenyon
T. Walter Fowler
Attorney.

UNITED STATES PATENT OFFICE.

OTIS ALLEN KENYON, OF NEW YORK, N. Y.

METHOD OF SERIES ARC-WELDING.

1,303,481.

Specification of Letters Patent.   Patented May 13, 1919.

Application filed January 9, 1918.   Serial No. 211,081.

*To all whom it may concern:*

Be it known that I, OTIS A. KENYON, a citizen of the United States, residing at New York city, in the county of New York and State of New York, have invented certain new and useful Improvements in Methods of Series Arc-Welding, of which the following is a specification.

My invention relates to a method of series arc welding, and the same consists of the steps and the process resulting therefrom, substantially as I will hereinafter describe and claim.

In the accompanying drawings I have illustrated various apparatus by which the present process may be carried out and wherein—

Fig. 3 illustrates internal connections for a controller which does not involve automatic means of removing a resistor from the line circuit after the arc has been extinguished.

Fig. 4 illustrates another method of connecting the controller.

Fig. 5 illustrates an arrangement wherein only one contactor is employed.

Fig. 6 is an enlarged part elevation and part sectional view of the contactor 4 of Fig. 4 showing its coils 8 and 11.

Figure 2:
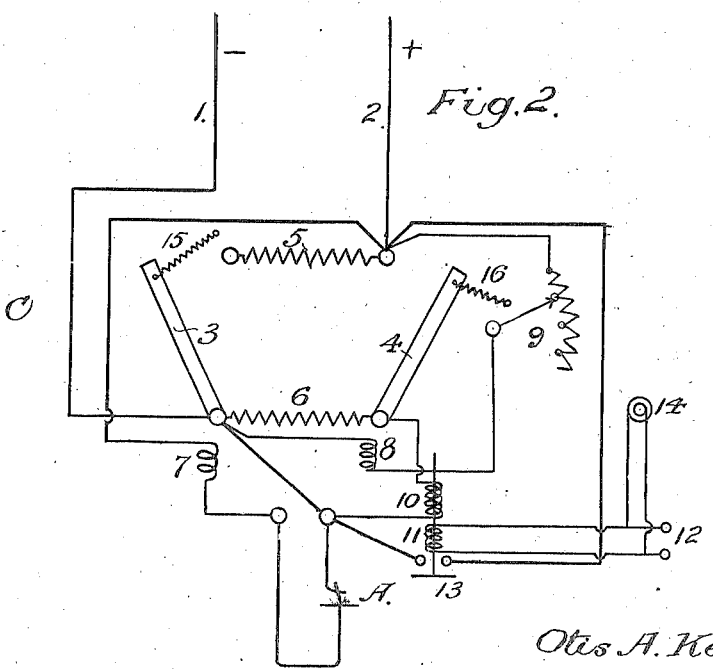
Fig. 2 illustrates the interior connection of one of the arc controllers, C.

Fig. 7 is an enlarged part elevation and part sectional view of the contactor of Figs. 2, 3 and 5 showing a single coil 7.

While the drawings show desirable embodiments of apparatus for carrying out the process I am about to describe, it will be understood that the process is not limited to these particular arrangements and that it comprehends and includes any mechanism or arrangement of parts which will produce the desired results.

In connection with the series arc welding system described and claimed in my prior Patent Number 1,181,227, dated May 2, 1916, it is often found desirable to connect a resistance in the main line on account of the fact that the line resistance itself is not sufficient to absorb shocks, due to sudden changes in load voltage and this allows momentary swings in the current which interfere with other welders on the line. To overcome this objection I have devised a method which comprehends the use of a resistance permanently connected in the line, the function of said resistance being, essentially, to dampen current fluctuations by absorbing energy. While this resistance as compared with the resistance required by constant potential systems is negligible, nevertheless, it is highly desirable to be able to reduce it to a minimum, and accordingly in my present method, it is the purpose to subdivide the artificial line resistance so as to leave a part of it permanently divided and the remainder divided equally between the welding outlets and connected in such a way that it is in circuit only when the operator is not welding, but may be arranged to go in circuit at the moment the operator stops working and in some instances a moment later be removed from the circuit automatically.

Figure 1:
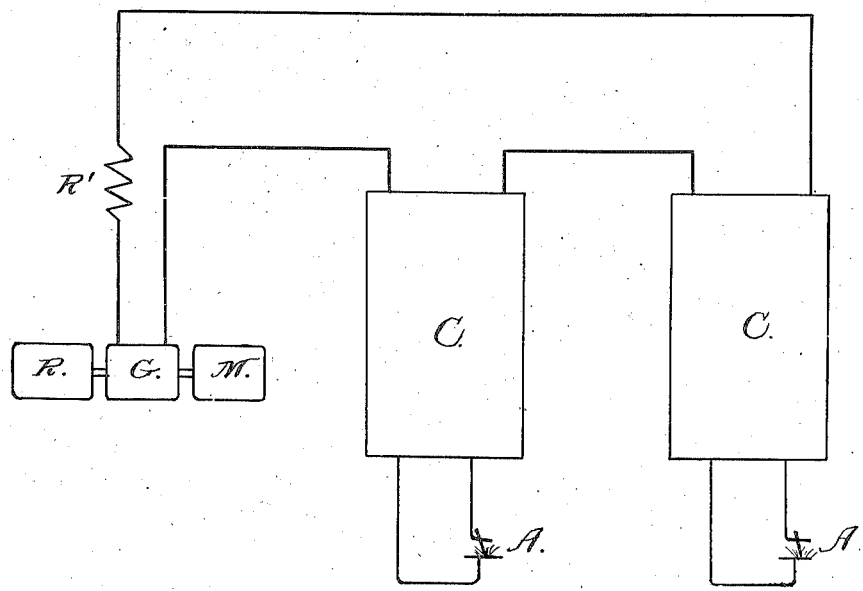
Figure 1 is a diagram showing the application of subdivided line resistances to a series arc welding system.

Referring to the accompanying drawings for a better understanding of the invention— In Figs. 1 and 2 I illustrate the application of my subdivided line resistance to a series arc welding system such as is covered by the aforesaid prior patent.

Fig. 1 shows diagrammatically the series arc welding system operated by a self-regulating motor-generator set, wherein M represents the motor; G the generator; R the regulator; R' the permanent line resistance; C the arc controller; and A the welding arc. The constructions and general arrangements of these controllers may be of the usual or any desired form, but in Fig. 2, I show the internal connection of an arc controller, C, which will be found very useful in the carrying out of my invention. In this figure, 1 and 2 are the line conductors; 3 and 4 are contactors; 5 and 6 are resistors; 7, 8, 10 and 11 are coils; 9 is a rheostat; 12 is an external source of excitation; 13 is a contactor; 14 is a circuit closer or push button; and 15 and 16 are springs connected to the contactors, 3 and 4.

In this arrangement, the line comes in at 1. Normally, the contactors 3 and 13 are closed and the circuit closer or push button 14 is open so that under those conditions the current beginning at 1, passes directly through the conductors to the contactor 13, and from there it passes to the conductor, 2. When the welder is already to begin operation, he closes the circuit by pressing the button, 14, which short circuits the winding or coil, 11, known as the holding coil, and this opens the contactor, 13. Now, the circuit is made through the contactor, 3, and the resistor, 5, to the line 2, and across the terminals of the arc, A, where we have a voltage equivalent to the drop in the resistor, 5. The operation of bringing the terminals of the arc together preparatory to starting an arc, will now draw current through the coil, 7, which opens the contactor, 3, against the pull of its spring, 15, thereby leaving the arc as the only circuit in series with the line. Under these conditions, the current continues to pass through the arc as long as the length of said arc does not exceed a predetermined amount.

It will also be noted that across the arc is connected the coil, 8, which is in series with the rheostat, 9, and when the arc voltage, which is a measure of the length of the arc, reaches a predetermined value, sufficient current will pass through the coil, 8, to close the contactor, 4, against the pull of its spring, 16, thereby inserting the resistor, 6, which is one of the subdivisions of the line before referred to, and in this way killing the arc, which will send a main line current through the resistor, 6. This resistor being included between the terminals of the coil, 8, will cause enough current to be sent through said coil to hold the contactor, 4, in the closed position.

Across the resistor, 6, I also have the coil, 10, and the current through said resistor will send sufficient current through the coil, 10, to close the contactor, 13, and this will short circuit the resistor, 6, and hold the coil, 11, excited from the external source, 13; the short circuit will be maintained until the welder is again ready to start, by pressing the button, 14. The contactor, 3, is closed at the same moment that current ceased in the arc circuit, because extinguishing the arc cut off excitation of the coil, 7, and allowed the spring, 15, to close the contactor, 3, thus the system is restored to its original position and is ready to start welding, as above described.

In Fig. 3 I show the application of my invention to a controller which does not involve automatic means of removing the resistor, 6, from the line circuit after the arc has been extinguished. Whenever it is desired to cut out the resistor, 6, it is necessary to close the hand switch, 10', which short circuits the panel and renders it inoperative. In this Fig. 3, the resistor, 6, is utilized to maintain sufficient current through the coil, 8, to hold the contactor, 4, in the closed position, and when the arc is struck, it short circuits the resistor, 6, and coil, 8, and allows the contactor, 4, to open. It is manifest that the closing of the switch, 10', will accomplish the same purpose.

In Fig. 4, I show another method of connecting the controller which does not provide automatic means for removing the resistor, 6, from the circuit, after the arc has been extinguished, but in this particular instance, I do not rely upon the drop through the resistor to hold the contactor, 4, in the closed position. For this last named purpose, in the instance noted, I utilize the holding coil, 11, excited from its source, 12, the switch being released by the push button, 14, when it is desired to begin welding.

Referring again to Fig. 2, the cycles of operation are substantially as follows:

I begin with practically no voltage between the terminals, 1 and 2, and by dropping out the contactor, 13, I insert the resistance, 5, which gives a voltage approximately equal to the normal arc. The striking of the arc does not change this voltage appreciably, but the drawing out of the arc to a maximum predetermined length, raises the voltage gradually, and when the predetermined value is reached, it is dropped suddenly to that corresponding to the resistance, 6, and a moment later it is dropped back to zero by short circuiting said resistance. Formerly, when the predetermined voltage was reached, this being the maximum load across the arc, the closing of the contactor, 4, short circuited the panel completely, thereby making a comparatively large and very sudden change in voltage.

In the construction found in Fig. 3, the operation is substantially as follows:

The contactors, 3 and 4, are assumed to be closed at the beginning of the operation. Touching the arc to the work short circuits the coil, 8, and this allows the contactor, 4, to open; practically speaking, the contactors, 3 and 4, open simultaneously. As the arc is drawn out, the voltage builds up, sending a proportionate amount of current through the coil, 8. Once the length of the arc reaches the limit fixed by the adjustment of the rheostat, 9, the current through the coil, 8, will become great enough to close the contactor, 4, placing the resistor, 6, in parallel with the arc. This resistance being relatively much lower than the arc, the effect is equivalent to short circuiting the arc, and thus extinguishes it immediately. As soon as the current in the coil, 7, decreases to a definite amount, the contactor, 3, closes, placing the resistor, 5, in parallel with the resistor, 6, thus reducing the resistance in series with the line and therewith the loss. The system is thus restored to its normal condition and is ready to start again.

The operation of the device shown in Fig. 4 is practically the same as that described for Fig. 3, except that the arc is started by releasing the contactor, 4, by means of the push button, 14, which short circuits the holding coil, 11. In both Figs. 3 and 4, the arc voltage rises to the upper limit, drops to a lower value fixed by the resistor, 6, and then to a still lower value fixed by resistance, 5, in parallel with resistor, 6. In Fig. 5 I show an arrangement employing only one contactor and in this instance the bringing of the welding electrode in contact with the work, short circuits the coil, 8, whereupon the arc branch is placed in series with the line and carries the line current. In this condition, the arc may be built up to the limit set by the rheostat in series with the coil, 8. When this limit is reached the coil, 8, closes the contactor, 4, placing the relatively low resistance, 6, in parallel with the arc which extinguishes it immediately, leaving the resistor alone in series with the line.

In Figs. 6 and 7, I illustrate a more or less detailed construction of the contactors 3 and 4 in order that the foregoing description may be better understood. The contactor 4, of Fig. 6, has, preferably two coils 8 and 11, corresponding to the showing of Fig. 4; the contactor of Fig. 7, has a single coil 7 similar to the showing in Figs. 2, 3 and 5.

Having thus described my invention what I claim as new and desire to secure by Letters Patent is:—

1. A method of series arc welding consisting in dividing the main line into sections each having a welding arc, striking an arc and drawing it out to a predetermined voltage limit, then shunting the arc and dropping the voltage of its section to a point below the arc voltage limit.

2. A method of series arc welding consisting in dividing the main line into sections each having a welding arc, striking an arc and drawing it out to a predetermined voltage limit, then shunting the arc and dropping the voltage of its section to a point below the arc voltage limit, and then short-circuiting said section.

3. A method of series arc welding consisting in dividing the main line into sections each having a welding arc, striking an arc and drawing it out to a predetermined voltage limit, then shunting the arc and dropping the voltage of its section to a point below the arc voltage limit, then further reducing the voltage in said section.

4. A method of series arc welding consisting in dividing the main line into sections each having a welding arc, striking an arc and drawing it out to a predetermined voltage limit, then shunting the arc and dropping the voltage of its section to a point below the arc voltage limit, then further reducing the voltage in said section, and then short-circuiting the said section.

5. A method of series arc welding consisting in dividing the main line into sections each having a welding arc, striking an arc and drawing it out to a predetermined voltage limit, then shunting the arc and dropping the voltage of its section to a point below the arc voltage limit, then gradually lessening the voltage in said section to zero.

6. A method of series arc welding consisting in dividing the main line into sections each having a welding arc, dividing the artificial line resistance into portions corresponding in number to the said sections, inserting in each section its portion of the artificial resistance, then dropping from the line the inserted resistance while its corresponding arc is in operation.

7. A method of series arc welding consisting in dividing the main line into sections each having a welding arc, raising the voltage in a section, then striking the arc of said section, then drawing out the arc to a predetermined voltage limit, then shunting the arc and dropping the voltage in said section below the arc voltage limit, and then dropping the voltage back to zero.

8. A method of series arc welding consisting in dividing the main line into sections each having a welding arc, raising the voltage in a section to equal approximately normal arc voltage, then striking the arc in said section, then drawing out the arc to a predetermined voltage limit, then shunting the arc and dropping the voltage in said section below the arc voltage limit, and then dropping the voltage back to zero.

9. A method of series arc welding consisting in dividing the main line into sections each having a welding arc, inserting a resistance into a section, then striking the arc of said section and removing said resistance, then drawing out the arc to a predetermined voltage limit, then shunting said arc with resistance, and then reducing the resistance of said shunt.

In testimony whereof I affix my signature.

OTIS ALLEN KENYON.